United States Patent [19]

VanGinhoven et al.

[11] 4,366,665
[45] Jan. 4, 1983

[54] PLASTIC FILM DISPENSER FOR ROUND BALER

[75] Inventors: Robert M. VanGinhoven, Lancaster; Shaun A. Seymour, New Holland; Harry C. Eberly, Narvon, all of Pa.

[73] Assignee: Sperry Corporation, New Holland, Pa.

[21] Appl. No.: 257,054

[22] Filed: Apr. 24, 1981

[51] Int. Cl.³ .......................................... A01D 39/00
[52] U.S. Cl. ........................................ 56/341; 100/88
[58] Field of Search .................. 56/341, 343; 100/88, 100/5, 87

[56] References Cited

U.S. PATENT DOCUMENTS

| | | | |
|---|---|---|---|
| 3,901,007 | 8/1975 | Blanshine | 56/341 |
| 4,167,844 | 9/1979 | Freimuth | 56/343 |
| 4,173,112 | 11/1979 | Meiners | 56/341 |
| 4,205,513 | 6/1980 | Shokoples | 56/343 |
| 4,224,782 | 1/1980 | Moflag | 53/587 |
| 4,248,343 | 2/1981 | Schaefer | 206/83.5 |
| 4,248,392 | 2/1981 | Parry | 242/96 |
| 4,262,478 | 4/1981 | Pentith | 56/341 |

FOREIGN PATENT DOCUMENTS 12684  6/1980  European Pat. Off. ............... 56/341

*Primary Examiner*—Jay N. Eskovitz
*Attorney, Agent, or Firm*—C. Hercus Just; Frank A. Seemar; Larry W. Miller

[57] ABSTRACT

A baler adapted to form round bales including a support for a supply roll of stretch cling-type of plastic film, power operated nip rolls to engage the outer end of said roll of film, a drag brake on said support to maintain tension on said film, cut-off mechanism including a toothed bar positioned below the roll of film and movable between operative and inoperative positions relative to said film, an electric switch near the operator's position to control a solenoid which moves the cutoff bar to inoperative position, support mechanism for rotating a roll bale to be wrapped with the film, powered mechanism to rotate the roll bale to be wrapped with the film while the nip rolls feed the free end of the film into engagement by the rotating bale roll for encircling the same with multiple convolutions of the film while the drag brake maintains tension thereon and rotation of the nip rolls then being stopped and the electric switch being operated to cause the solenoid to move the cutoff bar to operative position to engage the film and sever it while the film on the supply roll is engaged by the stopped nip rolls and thereby complete the wrapping of the roll bale with the film.

7 Claims, 8 Drawing Figures

PLASTIC FILM DISPENSER FOR ROUND BALER

BACKGROUND OF THE INVENTION

For many years, the preferred method of harvesting forage crop material has been to cut it, permit it to dry to at least a limited extent, form it into windrows and then form the windrows into separate rectangular bales tied by wire or twine. In more recent years, formation of the windrows into roll-type bales has become popular. Such roll bales are usually secured by spirally winding binder twine around the rolls to a suitable extent. One advantage of roll bales is that they may be stored in a field and the cylindrical nature thereof forms a natural means to shed water when rained upon, but at least the outermost portions of such roll bales becomes deteriorated if left exposed over a period of time.

To obviate the aforementioned deterioration of round roll bales, vary recent proposals have come forth to protect such bales with covering material, such as plastic film. One example of such solution is the subject of prior U.S. Pat. No. 4,173,112 to Meiners, dated Nov. 6, 1979, in which a roll bale is proposed to be wrapped in sheet plastic film by a number of convolutions thereof and then the covering plastic film is severed from a supply roll by a shaped blade having a V-shaped cutting edge. The end of the wrapped film is then glued to the roll or otherwise the roll may be left in a field and permit the weight of the roll to prevent unwrapping of the covering film from the roll bale.

The wrapping art also offers some suggestions as to how a large cylindrical object, such as a roll of paper may be wrapped with a paper sheet, such as proposed in prior U.S. Pat. No. 4,224,782, to Moflag, dated Sept. 30, 1980, but adaptation of the rather complex structure thereof to a baler for round bales appears to be cumbersome and complex.

A German published application, No. 2,705,101, filed Nov. 23, 1978, appears to suggest wrapping a roll bale of agricultural material with a strip of what seems to be plastic material of limited width wound spirally around a roll bale with the edges of the successive convolutions overlapping a limited extent by threading the supply roll transversely across the bale somewhat similarly to the wrapping of binder twine around such a bale, as mentioned above relative to roll balers of earlier years.

The securing of plastic film coverings to roll bales has been a problem which has now led to the proposal to use stretch cling-type plastic film material which has the advantage of the convolutions of such film clinging or adhering to each other when wrapped around an article, such as a roll bale of forage material and this characteristic has the added advantage of automatically attaching the outer end of the wrapped film to the next layer thereof. Providing means to handle and apply such stretch cling-type plastic film requires departure from using the prior types of film wrapping mechanisms referred to above and the present invention has been conceived to utilize such type of plastic film for use in balers for roll bales, details of the structure to accomplish this being described below.

SUMMARY OF THE INVENTION

It is among the principal objects of this invention to provide a mobile-type roll baler with means to support a formed roll bale for rotation to permit encircling the same with a limited number of convolutions of stretch cling-type plastic film at least as wide as the length of the roll bales, support a supply roll of such film in the baler forwardly of the roll bale, engage the outer end of said roll of film by a pair of nip rolls which are power driven to cause unwinding of the film from the supply roll when wrapping of the roll bale takes place, and power means rotates the roll bale in the baler to effect encircling the roll bale with a limited number of convolutions of the film, and support an elongated tooth cutter bar for movement between an inoperative position out of contact with the film and an operative position in which the teeth of the bar engage and penetrate a section of the film which is held taut between the wrapped roll bale and the nip rolls which are held stationary at such time in gripping engagement with the film, whereby continued rotation of the wrapped roll bale by the baler effects severing of the wrapped film from the supply roll which is held stationary by the nip rolls.

Another object of the invention is to form said nip rolls in a non-continuous nature, such as by providing a series of relatively narrow rolls in longitudinally spaced relationship upon shafts to which they are fixed, the individual rolls on the pair of shafts being in similar alignment for co-engagement while providing ample space between the pairs of rolls to permit passage of chaff and the like through said spaces and prevent accumulation thereof.

A further object of the invention is to move the cutter bar by means of a solenoid-actuated plunger interconnected to the support for the toothed cutter bar and to provide control means for actuating the solenoid to move the cutter bar to inoperative position out of contact with the film and also initiating operation of the nip rolls to feed the film supply to the roll bale.

Still another object of the invention is to control operation of said solenoid by means of an electric switch and also provide a drag brake operating upon the supply roll of film to effect tensioning the stretch-type film incident to the same being wrapped around the roll bales.

One further object of the invention is to use stretch cling plastic film which preferably is wider than the length of the roll bale, whereby the opposite edges of the film, when wrapped around the roll bale, tend to contract and somewhat form cuffs extending around the ends of the roll bale and thereby prevent any appreciable transverse shrinking of the wrapped film if the material of the roll bale attempts to expand laterally.

Details of the foregoing objects and of the invention, as well as other objects thereof, are set forth in the following specification and illustrated in the accompanying drawings comprising a part thereof.

DETAILED DESCRIPTION OF THE PREFERRED EMBODIMENT

Figure 1:
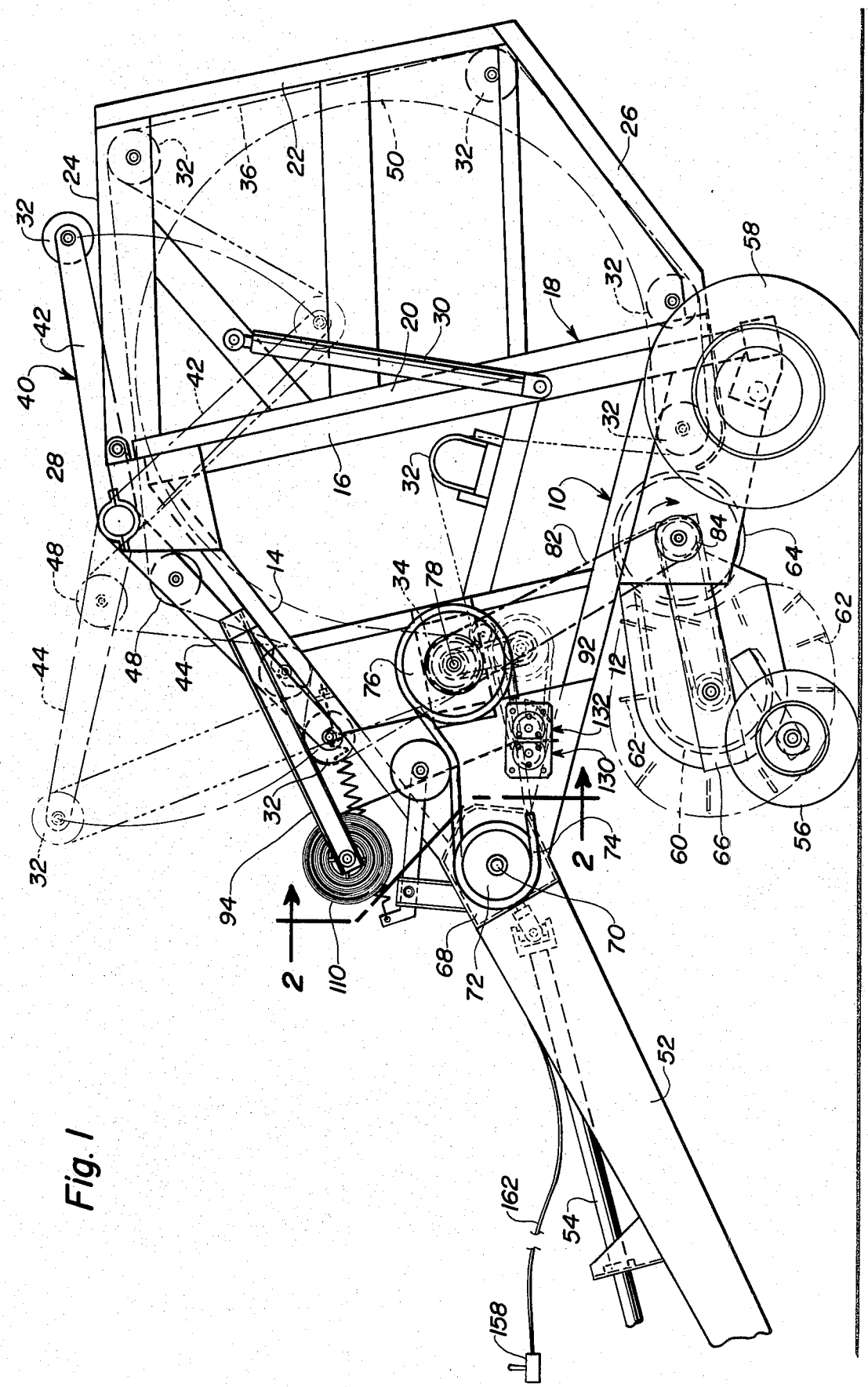
FIG. 1 is a side elevation of a baler for forming round roll bales and including means for wrapping the plastic film around the formed bale in accordance with the principles of the invention, said view, at the left-hand end, showing fragmentarily a drive shaft and tongue, attachable to a tractor.

FIG. 1 is a side elevation of a machine for forming roll bales. Essentially, the machine is of the type shown in a number of prior patents, of which U.S. Pat. No. 3,901,007, to Blanshine et al, Hay Roll Forming Macine, dated Aug. 26, 1975, is one typical example of a machine which normally is propelled by being connected to a tractor, not shown, which pulls the baler over a windrow that is continuously moved into the machine and formed into a round roll bale, comprising successive layers of the material, the roll being without a supplemental core of any kind, and upon the formation of a roll bale of suitable size, as controlled by the operator of the tractor, the machine is stopped but the apron which surrounds the bale and continuously rotates it, continues to revolve to effect the wrapping of the formed bale, with a limited number of convolutions of stretched cling-type plastic film, and then is ejected from the machine onto the field. Only the essential parts of the baler as described hereinafter are necessary for any explanation of the present invention, comprising the wrapping mechanism.

Referring to FIG. 1, the baler comprises a substantially triangular shaped frame 10 consisting of frame members 12, 14, and 16, which are rigidly connected and it will be understood that such a triangular-shaped frame member is provided respectively at opposite sides of the baler, and said side frame members being connected by tranverse frame members, not shown, but of the type illustrated in said aforementioned patent. A supplemental, movable frame section 18, in side elevation, is somewhat in the form of a trapezoid, and consists of parallel frame members 20 and 22, to the ends of which an additional pair of angularly related frame members 24 and 26 are connected. The supplemental frame section 18 is pivotally connected to the upper portion of the triangular shaped frame 10 by a pivot 28, and the supplemental section is moved about said pivot at the time of discharging a formed bale by means of a pair of hydraulic cylinder units 30, respectively disposed at opposite sides of the baler. Supplemental frame section 18 supports a plurality of freely-rotatable guide sheaves 32 and triangular frame 10 supports additional freely-rotatable guide sheaves 32, as well as drive sheaves 34, which propel a flexible, endless apron 36 consisting of a pair of endless chains respectively disposed adjacent opposite sides of the baler in the frames 10 and 18, said chains supporting transversely therebetween a plurality of spaced, parallel bars 38, best shown in FIG. 2. This type of structure is disclosed in said aforementioned U.S. Pat. No. 3,901,007. In view of the fact that the bale, while being formed, continuously expands in diameter, it is essential that the apron 36 be arranged for suitable expansion from an initial position to an ultimate final position, and this is accomplished by a rocker arm arrangement 40, consisting of pairs of angularly related arms 42 and 44 supported upon a shaft 46, pivotally mounted at the upper end of triangular frame 10, as clearly shown in FIG. 1. The outer ends of the arms 42 and 44 also support freely-rotatable guide sheaves 32 thereon, the arms 44 additionally supporting further guide sheaves 48, the rocker arm arrangement 40 comprising pairs of the arms 42 and 44 respectively at opposite sides of the baler frame, and adapted to be moved initially from the phantom position, show in FIG. 1, to the full-line position shown therein, as the apron 36 expands to form the substantially circular configuration 50, shown in FIG. 1, and illustrated by a broken line, and circular configuration representing the ultimate size of a roll bale to be formed by the baler, and the rocking of the arm arrangement 40 permitting the expansion of the apron around the completed roll bale by movement of the rocker arm arrangement 40.

The frame 10 has a tongue 52 extending forwardly therefrom and connected to an appropriate tractor, not shown, the tractor also having a p.t.o. to which a drive shaft 54 is connected for driving the operating means on the baler. The baler frame is supported by pairs of wheels 56 and 58, respectively mounted on portions of the frame 10 at opposite sides of the baler. The lower forward portion of the baler also supports a driven crop pickup conveyor 60 having appropriate fingers 62 projecting therefrom, the conveyor extending toward a roller 64, the shafts of which are mounted in appropriate bearings in angular frame member 66, of which one is disposed adjacent each side of the baler.

Figure 2:
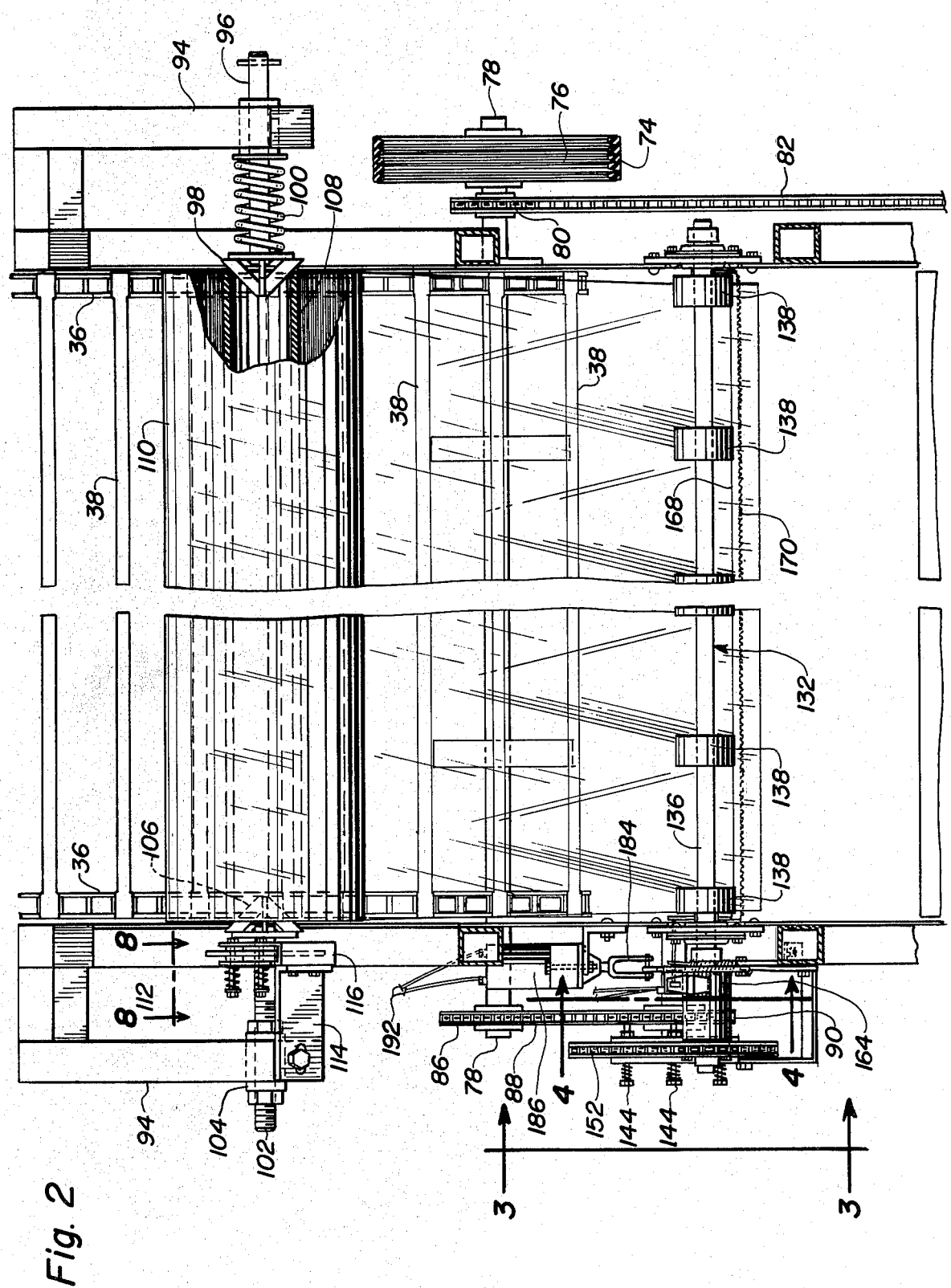
FIG. 2 is a fragmentary, further enlarged, vertical sectional elevation of certain portions of the baler shown in FIG. 1, as seen on the line 2—2 thereof.

The p.t.o. operates drive shaft 54 which, in turn, operates a gear box 68, which includes a transverse drive shaft 70 upon which a multiple sheave 72 is mounted, and around which a plurality of V-belts 74 extend, as clearly shown in FIGS. 1 and 2, said V-belts 74 also extending around a larger diameter multiple sheave 76 supported on shaft 78, which is one of the principal drive shafts of the baler.

Also, as seen in FIG. 2, mounted upon shaft 78 is a smaller diameter drive sheave 80, around which a sprocket chain 82 extends, said chain also extending around a drive sheave 84, see FIG. 1, connected to the shaft of the roller 64 of the crop pickup conveyor 60, and thereby operates the same to drive said conveyor in the direction of the arrow, shown in FIG. 1, relative to the roller 64.

Referring to FIG. 2, the shaft 78, at the left-hand end, also supports another drive shaft 86, around which an endless sprocket chain 88 extends, the chain 88 also extending around the sprocket gear 90, fixed to a jack shaft 92.

The principal improvement afforded by the present invention comprises means to support and wrap a film of stretch cling-type plastic film around a completed roll bale. To accomplish this, the frame 10 supports a pair of forwardly extending supporting arms 94, see FIG. 1, the outer ends of which, as best shown in FIG. 2, respectively support an axially movable short shaft 96 having a conical roll-supporting member 98 on the inner end thereof which is spring-pressed to the left, as viewed in said figure, by means of a compression spring 100. The left-hand arm 94, as viewed in FIG. 2, supports a short shaft 102, which extends through a bushing 104 which is rotatably mounted in the outer end of arm 94, and the inner end of shaft 102 supports another conical roll-supporting member 106, best shown in FIG. 8. The conical roll-supporting members 98 and 106 respectively support therebetween the tubular core 108, see FIG. 2, of a roll 110 of plastic film of the stretch cling-type, the width of said material preferably being greater by a predetermined amount than the length of the roll of crop material to be covered thereby, particularly for purposes of permitting the extending ends of the wrapped film material, when in finished wrapped condition, shrinking or contracting a limited amount, and providing somewhat cuff-like end arrangements to further secure the wrapped film around a finished bale and also prevent contracting of the same in axial directions while being stored.

Figure 8:
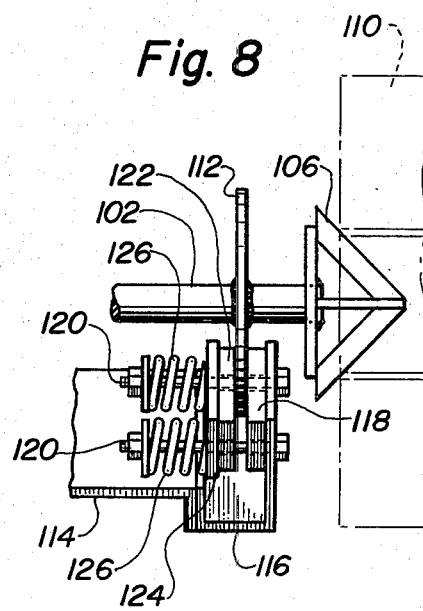
FIG. 8 is a fragmentary horizontal sectional view of friction drag mechanism for the plastic supply roll, as seen on the line 8—8 of FIG. 2.

For purposes of maintaining the plastic film material taut at all times during operation, especially to prevent over-running of the roll of material while being withdrawn from the roll by mechanism described hereinafter, the shaft 102 is provided with friction brake means, best illustrated in FIG. 8. Said brake means somewhat resembles a disc brake on automotive vehicles in that a circular disc 112 is fixed to the shaft 102 adjacent member 106, and a transverse arm 114, which is connected at one end to supporting arm 92 at the left-hand end of FIG. 2, supports a bracket 116 to which one friction shoe 118 is fixed, and a pair of bolts extend through openings in said shoe to fix it against movement relative to the shoe 116, the bolts 120 also extending through a movable friction shoe 122, backed up by a plate 124, which is resiliently pressed by springs 126 against one face of the disc 112, while the fixed shoe 118 engages the other face thereof, and thus, provides adjustable tension means to maintain the film 110 under tension at all times, as described in further detail hereinafter.

Figure 4:
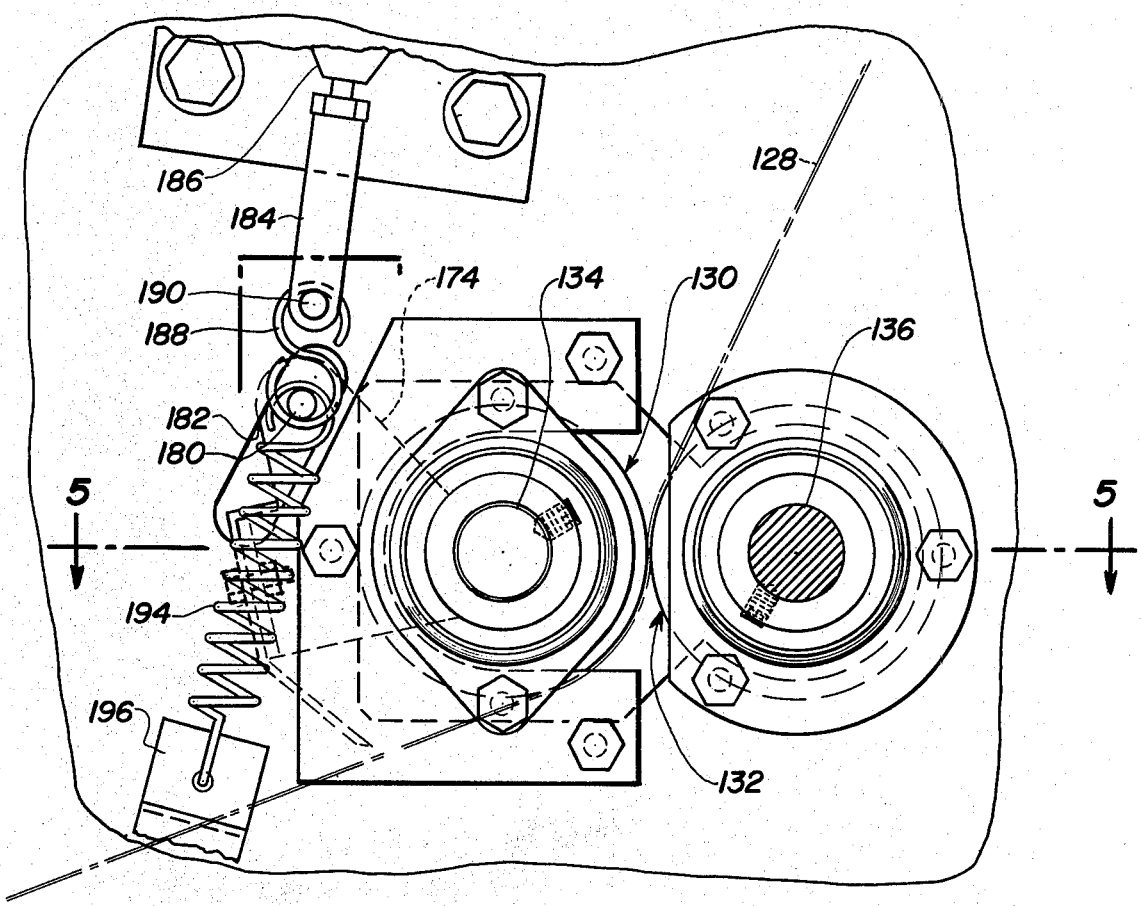
FIG. 4 is a further vertical sectional view illustrated fragmentarily, showing further details of certain drive means of the baler, as seen on the line 4—4 of FIG. 2.
Figure 5:
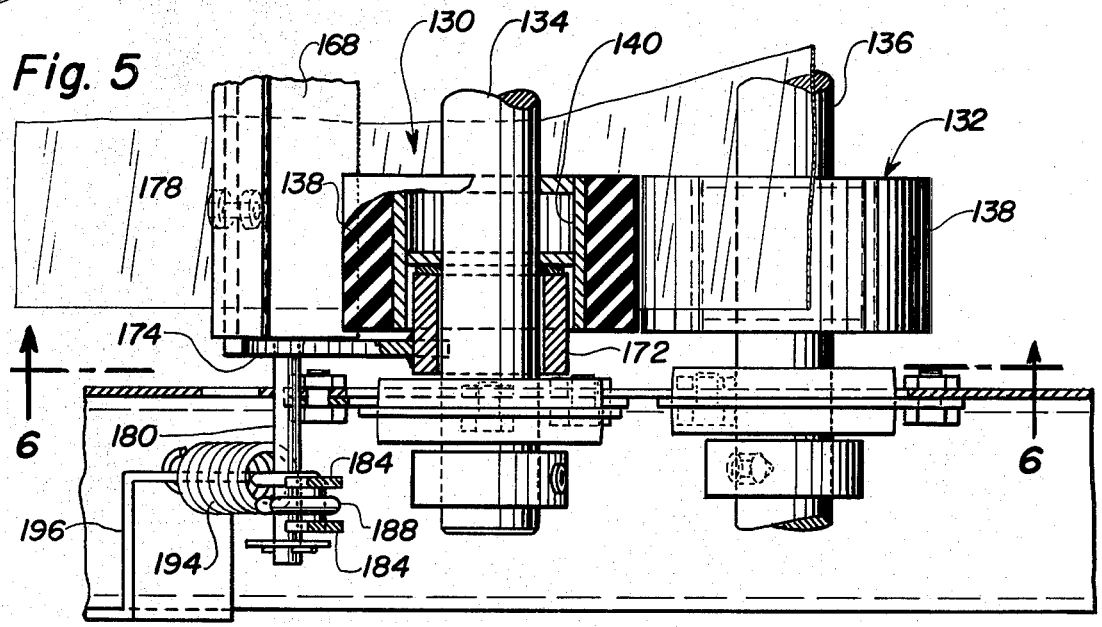
FIG. 5 is a horizontal fragmentary sectional view of the mechanism shown in FIG. 4, as seen on the line 5—5 thereof.

As shown in FIG. 1, the leading end 128 of the film of supply roll 110 extends to and between a pair of composite-type feed nip rolls 130 and 132, which are best shown in detail in FIGS. 4 and 5. Said feed nip rolls actually comprise parallel shafts 134 and 136 upon which a plurality of relatively narrow friction rolls 138 are fixed. The rolls 138, as shown best in FIG. 5, in which one of the same is shown in section, consists of cylindrical, relatively thick rubber friction members mounted upon cylindrical metal cores 140, which, in turn, are fixed to the shafts 134 and 136. Referring to FIG. 2, in which composite feed roll 132 is shown, it will be seen that the shaft 136, as well as shaft 134, behind shaft 136 in FIG. 2, supports a plurality of the friction rolls 138 in spaced relationship to each other, the spaces being substantial for purposes of preventing accumulation of any chaff or other extraneous material falling upon the rolls, particularly if they were of a solid nature in an axial direction. The film material is constantly engaged by the friction rolls 138, in view of the fact that the rolls on the respective shafts 134 and 136 are directly opposite each other, and if said rolls were of a solid continuous nature between opposite sides of the baler, it is conceivable that a considerable amount of extraneous material could accumulate between the upper surfaces of said rolls, in view of the fact that they normally are stationary while the bale roll is being formed. The spacing of the rolls 138, in accordance with the present invention, however, amply prevents this. However, one skilled in the art will readily realize that solid nip rolls 130, 132 would be operable to feed the film supply.

Figure 3:
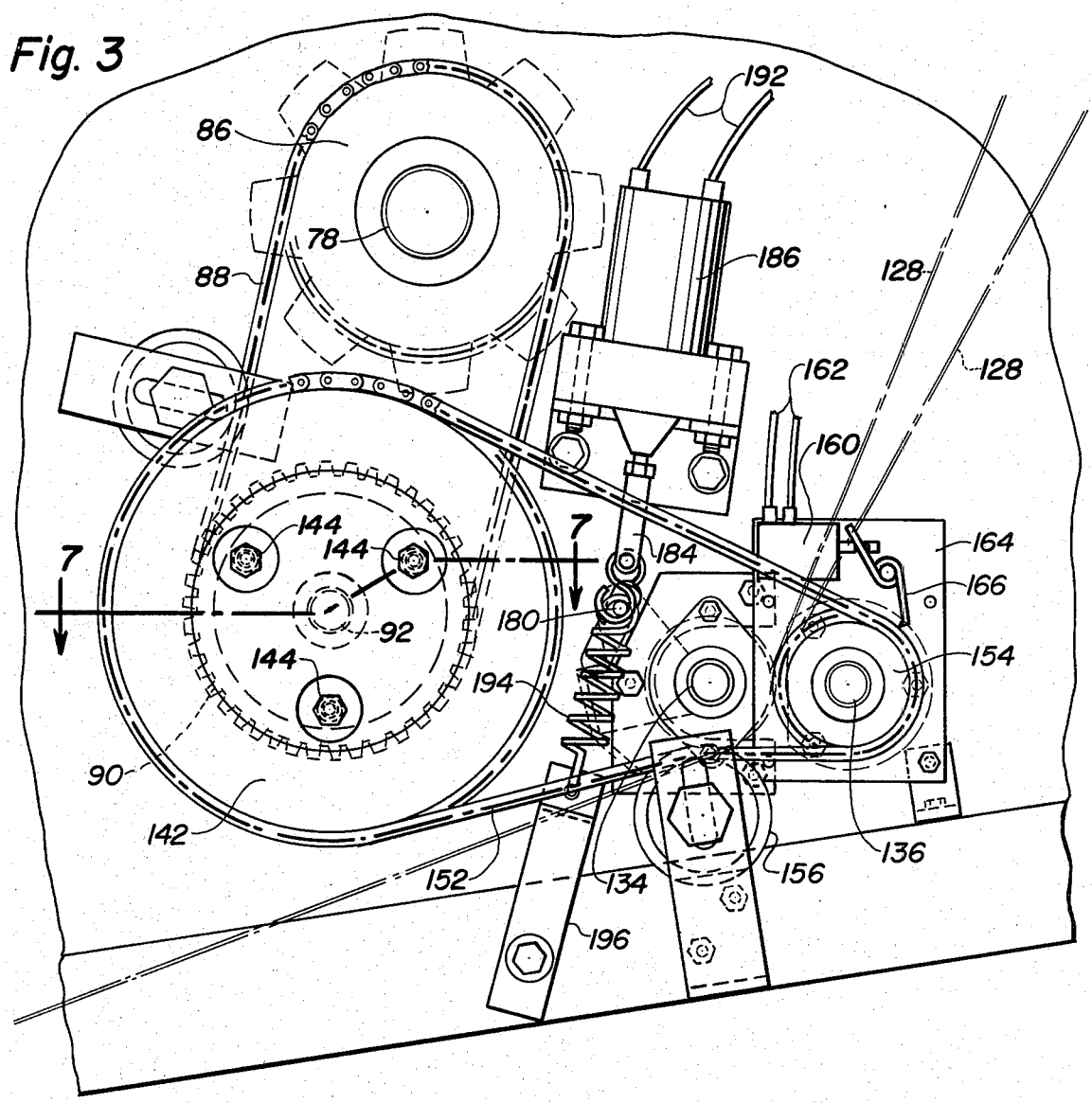
FIG. 3 is a fragmentary vertical sectional elevation, on a still further enlarged scale, showing details of some of the drive mechanism of the baler, as seen on the line 3—3 of FIG. 2.
Figure 7:
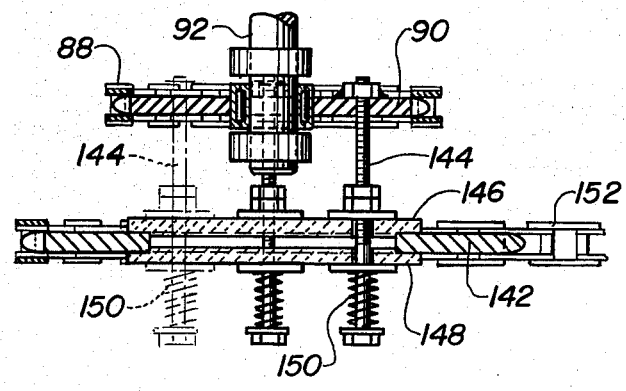
FIG. 7 is a fragmentary horizontal sectional view of details of slip clutch mechanism shown in FIG. 3, as seen on the line 7—7 of said figure.

Referring to FIG. 3, as has been explained above, jack shaft 92 drives sprocket gear 90. In turn, sprocket gear 90 drives a larger diameter sprocket gear 142, and actually supports the same, as is best shown in FIG. 7, in sectional view, by means of a plurality of bolts 144, which are fixed at one end to sprocket gear 90, and also extend through a pair of friction discs 146 and 148. Also, the sprocket 142 actually is a flat annular configuration of which the center is removed and the peripheral edges of the central portion of sprocket gear 142 respectively are engaged by rims of the friction discs 146 and 148 in a yieldable manner caused by the compression springs 150. The arrangement just described actually comprises a friction clutch for the sprocket gear 142 around which chain 152 extends, the chain also extending around driven sprocket gear 154 which is rotatably supported upon shaft 136 in a manner to be engaged with said shaft to drive the same when driving of the friction feed rolls 130 and 132 is to commence. An adjustable tightening idler sprocket 156 at each side of the baler respectively engage the sprocket chains 152.

It is to be understood that at the commencement of the formation of a round roll bale, the film roll 110 is stationary, as are the friction feed rolls 130 and 132, and the leading end of the film extends from the supply roll 110 to the friction rolls and usually a short leading end extends beyond the feed rolls and hangs there. When the roll bale has reached the desired diameter, the operator of the tractor actuates a control switch 158, as shown somewhat diagrammatically in FIG. 1, for purposes of energizing an electric clutch operator 160, shown in FIG. 3, from which a pair of electric conducting wires 162 extend therefrom to the switch 158, which is also in circuit with a source of power, not shown. The clutch operator 160 is part of an electric clutch 164 of a commercial type which has the capability of interengaging the shaft 136 and the driven sprocket gear 154 thereon by mechanism which includes a dog 166 actuated by the clutch operator 160. This occurs when the feed of the leading end of film 128 is to commence. In FIG. 3, two paths of the film 128 are shown in phantom, one of these being when the supply roll is substantially full, and the other when the supply roll is nearly exhausted. In any event, operation of the electric clutch 164 causes the friction feed rolls 130 and 132 to advance said leading end of the film into the path of the material being delivered to the baler by the crop pickup conveyor 60, and in view of the inherent nature of the stretch cling-type plastic film, the leading end is readily engaged by the oncoming material when the tractor and baler have been stopped from forward movement but while the apron 36 continues to rotate the bale a desired number of revolutions to permit a comparable number of plies of the plastic film to be wrapped around the bale.

Figure 6:
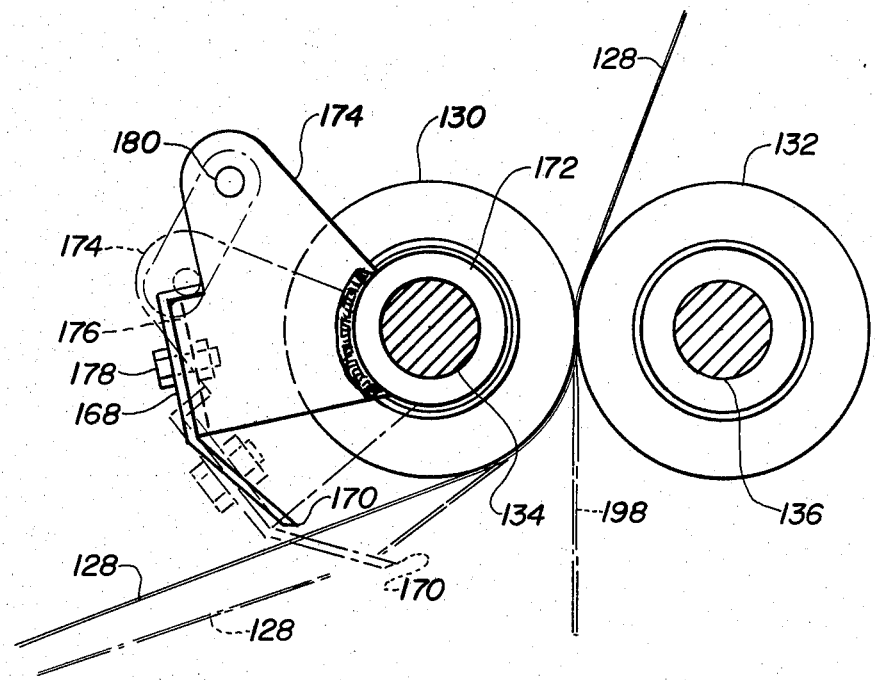
FIG. 6 is a vertical sectional view, somewhat diagrammatically illustrating the manner in which film severing mechanism is located and operated, as seen on the line 6—6 of FIG. 5, showing the position of the severing knife in idle position in full lines and, in phantom, illustrating the same in operative, film-severing position.

Severance of the plastic film from the wrapped bale is effected by the following arrangement. As indicated above, the film extending from the supply roll 110 to the friction feed rolls 130 and 132 is maintained under tension. Referring to FIGS. 4-6, especially to FIG. 6, it will be seen that the severing means for the film comprises a cutoff bar 168, which extends entirely across the baler between opposite sides thereof and is of an irregular angular shape, as shown best in end view in FIG. 6, for purposes of strengthening the cutoff bar to prevent bending or wavering of the same. The terminal edge 170 of bar 168 is toothed continuously between opposite ends, as shown in FIG. 2. Referring to FIG. 5, where one end of shaft 134 is shown, it will be seen that said end of the shaft is surrounded by a short sleeve 172 and a similar sleeve extends around the opposite end of shaft 134. Extending radially from each of the sleeves 172 is a radial plate or arm 174 of a somewhat V-shaped configuration, one end of each arm being welded to the sleeve 172 and the outer end having a lateral flange 176 to receive a connecting bolt 178, which also extends through each end of the toothed cutoff bar 168.

Projecting outwardly from one arm 174 is a pin 180 which extends through a slot 182, see FIG. 4, in the side frame plate. A link 184 which extends from the core of solenoid 186, best shown in FIG. 3, is connected by a hook member 188 to pin 180. Also, link 184 actually is a clevis comprising a pair of parallel members, shown in section in FIG. 5, and having a pin 190 extending therebetween, which is engaged by the hook member 188.

Solenoid 186 also is connected by a pair of electrical conductors 192 to the circuit in which switch 158 is included. Further, the circuit and a type of control switch 158, is such that during the time the roll bale is being formed, the solenoid 186 is energized and holds the cutoff bar 168 with its toothed edge in retracted, full-line position, shown in FIG. 6, so that it does not engage the film 128, which is being fed by the friction feed rolls 130 and 132 in the direction to encircle the roll bale. Upon the completion of the wrapping of the film around a roll bale, however, the operator on the tractor then again actuates switch 158 in a manner to de-energize the electric clutch 164, which immediately halts the driving of the friction feed rolls 130 and 132 and simultaneously de-energizes the solenoid 186 in a manner to permit the toothed cutoff bar 168 to move to the phantom position, show in FIG. 6, and thereby engage the film section 128 to penetrate it, as shown in the second, lower position thereof, illustrated in FIG. 6, while the wrapped roll bale continues to be rotated by the apron 36, whereby such continued pull of the film by the rotating bale insures severance of the same by the toothed terminal edge 170 of the cutoff bar 168. Movement of the cutoff bar to the severing position, shown in phantom in FIG. 6, is instantly effected by tension spring 194, which extends between a fixed bracket 196 on the baler frame and pin 180. One skilled in the art will further realize that a switch 158 spring-loaded to the off position, or a switch 158 in conjunction with a timer (not shown) would be equally operable instead of the switch 158 as described above.

Following the severance of the film as described, there will be a short section of the film 198 depending from the stationary friction feed rolls 130 and 132 and thus, be in position to be fed thereby to the next roll bale to be formed and wrapped.

The foregoing description illustrates preferred embodiments of the invention. However, concepts employed may, based upon such description, be employed in other embodiments without departing from the scope of the invention. Accordingly, the following claims are intended to protect the invention broadly, as well as in the specific forms shown herein.

Having thus described the invention, what is claimed is:

1. A baler to form round roll bales comprising in combination, a mobile frame having means to form a round roll bale from a windrow of forage material and support the same when formed for rotation, means on said frame to support a supply roll of plastic film, means to support a pair of nip rolls for engagement with the outer end of the film on said roll thereof, power means to rotate said nip rolls in feeding direction, film cutoff mechanism comprising an elongated toothed bar supported by said frame and extending transversely between opposite sides of said frame for movement between operative and inoperative positions relative to said film, means to move said cutoff bar selectively between said positions, forage material pickup means on said baler operable to feed cut material to said baleforming means, control means for said power means for said nip rolls having a first position operable substantially upon the completion of formation of a roll bale of desired diameter to actuate said nip rolls in feeding direction to advance the outer end of said film toward said material pickup means for engagement of said film with said roll bale while said bale is rotated in said mobile frame to effect wrapping of said film around said bale to a desired extent and said control means having a second position to activate said means to move said cutoff means upon completion of the wrapping of said bale with said film to advance said cutoff bar to the operative position thereof in which it engages a taut portion of said film to penetrate and sever it, and said control means when in said second position also being operable to hold said nip rolls stationary while said cutoff bar is advanced to said operative position so that said nip rolls grip said film and place tension thereon between said supply roll and said roll bale to insure penetration of the teeth of said cutoff bar into said film to cause separation of the roll-encircling film from said supply film.

2. The baler according to claim 1 further including a drag brake operable upon said supply roll of film to place tension thereon while being wrapped around the roll bale to effect desired tightness in said film encircling the same.

3. The baler according to claim 1 further characterized by said plastic film being of a stretch cling-type to effect securing of the convolutions of the wrapped film to each other and to said bale.

4. The baler according to claim 1 in which said nip rolls are similar and each comprise a shaft supporting in longitudinally spaced relationship similarly positioned narrow frictional rolls coengageable with the wrapping film and providing spaces between the rolls through which chaff and the like may pass while the roll bale is being formed and thereby prevent accumulation of chaff by the position of said feed rolls when inoperative.

5. The baler according to claim 1 in which said cutoff bar when in said inoperative position is spaced from said film, and said means to move said cutoff bar comprising a solenoid having a plunger connected to a movable support means for said cutoff bar, and said control means comprising a switch in a current supply line from a source of power connected thereto, said switch being manually operable when a roll bale is to be wrapped to activate said solenoid to move said bar from the path of movement of said film during wrapping of the roll bale and upon completion of said wrapping said switch being operable to deenergize said solenoid and permit movement of said cutoff bar into severing penetration of said film to detach the wrapped film from the supply roll thereof as aforesaid.

6. The baler according to claim 5 in which said control means for said power means to rotate said nip rolls is operated incident to movement of said toothed bar to film severing position to stop rotation of said nip rolls and thereby place tension upon said film between said wrapped roll bale and said nip rolls, and said toothed bar is disposed between said nip rolls and wrapped roll bale thereby to cause said severing penetration of said film by the teeth of said bar due to continuous rotation of said roll bale for wrapping thereof with said film.

7. The baler according to claim 5 further characterized by said toothed bar being supported upon arms pivoted about a fixed axis and pins project from said arms, means connecting the solenoid plungers to said pins and operable to hold said toothed bar out of contact with said film while said roll bale is being wrapped, and said baler further including spring means engaging said pins on said arms to move said toothed bar into operative position to penetrate said film after said solenoids have been de-energized as aforesaid and thereby effect severing of said film.

* * * * *